Patented Jan. 18, 1927.

1,614,947

UNITED STATES PATENT OFFICE.

HIRAM W. BLAISDELL, OF LOS ANGELES, CALIFORNIA, ASSIGNOR TO THE BLAISDELL FILTRATION COMPANY, A CORPORATION OF DELAWARE.

FILTRATION PROCESS.

No Drawing. Application filed December 12, 1921. Serial No. 521,693.

This invention relates particularly to those filtration processes in which a liquid is passed through a medium which comprises a plurality of particles of one or more materials, in order to remove foreign matter therefrom, and its object is to increase the capacity and efficiency of the installations or appliances which are used for this purpose. Another object is to provide a simple method of operating filters for the purpose of maintaining their effectiveness and rate of flow. More specifically, the object of this invention is to restore a partially clogged filter to its former state of permeability and effectiveness without changing its physical organization and without removing from it certain detained foreign matter which serves a useful purpose in the filtering operation.

These and other objects of my invention and the novel manner in which these objects are attained will appear in a following specification in which the invention will be described and its novel features pointed out in appended claim.

As an illustration of an application of this invention it may be assumed that a gravity sand filter for water has been prepared by placing at the bottom of a filter bed, a base layer of comparatively coarse material, such as gravel, and superimposing thereon one or more layers of finer material; preferably several layers of progressively finer particles of like or unlike characteristics as desired. After such materials have been deposited and before water to be filtered is admitted, they may be subjected to a thorough mechanical stirring, mixing and washing to a desired depth. Then water is admitted above the upper surface of the bed thus formed, allowed to flow through the filtering materials, and is drawn off from the bottom of the bed through suitable discharge openings. It is known that as a filter is operated a film is formed at the surface of the bed by the impurities removed from the water and that the rate at which the water flows through the bed decreases gradually. These impurities retained on the bed contain matter which has a highly desirable biological effect upon micro-organisms, bacteria and foreign matter in the raw water and except for the fact that this foreign matter gradually clogs the interstices between the particles of the filtering media, its presence is desirable. Such a bed is used until its permeability is so decreased that the rate of flow of the water becomes insufficient for practical purposes. At such a time, according to former practice, the bed has to be renovated by stirring and washing, or by the removal of the clogged surface material. Sometimes water under pressure is forced through the bed from the bottom with sufficient velocity to agitate and scour the particles of the filtering media and to wash out the foreign matter and impurities from the interstices and from the particles. In such cases the turbid water is drawn off and thrown away as it accumulates above the filter bed.

I have discovered that the permeability and purifying effectiveness of the bed may be restored without disturbing the physical organization of the bed and without the loss of the elements which have been detained in it when operating as a filter. This result may be attained in the following manner. The inlet and discharge conduits are closed. Then water is admitted to the bottom of the bed and allowed to rise up slowly through the bed. When the discharge pipes are used for the admission of this reverse flow water, the gravel and coarser particles at the bottom of the bed distribute the incoming water and cause it to spread in all directions under and up through the bed. This treatment does not cause any turbidity in the water above the bed. After treatment for a short time, the filtering operation may be resumed and it will be found that the permeability and purifying effectiveness of the bed has been restored. Moreover, it is found that by the use of this reverse flow process the length of runs between regular cleanings is greatly increased.

This process enables the use of finer particles of filtering material at the top of the bed than has been feasible heretofore, for the use of such extremely fine particles has been prohibitive because such particles caused the bed to be too quickly clogged and thereby rendered ineffective. A further advantage is that filtering materials may be chosen which have greater differences in degree of fineness and can be put into the bed without the extreme care heretofore needed, both of which facts lessen the cost of making up the bed.

It is known that certain elements of an insoluble and gelatinous nature are deposited with the matter detained at the top of the bed upon the particles of the filtering media, and that sand, for example, has a certain retentivity for such elements. It is also known that as the presence of such elements on the particles becomes more defined, their capacity for retention of similar elements and of certain bacteria increases. It is also known that certain desired biological activities are set up which depend upon the presence of certain elements and also upon the life of the bacteria. But these same otherwise desirable elements also gradually block up the interstices and clog the filter.

A probable reason for the new phenomena and beneficial results attained by the use of this invention is that the elements which clog the filter tend to form a very thin but practically impermeable film of gelatinous character at or near the surface of the filter which in time blocks up the interstices. This film is built up under the influence of a flow of water in one direction. It is, however, apparently broken up readily by a change of the direction of this flow. The matter of which the film is formed is probably broken into infinitesimally small particles by the reverse flow which then forms a new filtering medium.

The minute gelatinous particles thus formed remain at the surface of the bed and act as a purifying agency because they have an adhesive property and amalgamate with other foreign substances which are removed from raw water.

Whatever the theory of operation may be, it is a fact that a filter bed with an area of three-eighths of an acre which, heretofore, could be used only three and a half days before it had to be subjected to mechanical washing, has been used continuously for six weeks by the application of this invention, during which time an inch of foreign matter accumulated on the surface of the bed.

This invention is of greater scope than the illustrative embodiment of it which has been described and consequently I intend no limitations other than those imposed by the following claim.

What I claim is:—

That improvement in processes for maintaining effectiveness of filter beds which gradually clog by reason of retention of sediment and foreign matter extracted from the raw water flowing downwardly therethrough by gravity, which consists in reversing the water flow and passing it upwardly through the filter bed in the reverse direction at a low rate of travel insufficient to remove the sediment from the filter bed but sufficient to cause relative rearrangement of the material of the bed and sediment, thus leaving the sediment in and on the filter bed surface to become a composite part of the filter media.

In witness whereof, I have hereunto set my hand this 2nd day of December, 1921.

HIRAM W. BLAISDELL.